US008880658B2

(12) United States Patent
Kulathu et al.

(10) Patent No.: US 8,880,658 B2
(45) Date of Patent: Nov. 4, 2014

(54) METHOD AND SYSTEM FOR PUBLISHING DATA FROM INTELLIGENT ELECTRONIC DEVICES

(75) Inventors: Ganesh Kulathu, Bangalore (IN); Uwe Klich, Recklinghausen (DE); Sasi Kumar, Vengipalayam (IN); Vivek Gopalakrishnan, Vellore (IN); Tobias Gentzell, Västerås (SE); Padmasri Krishnamurthy, Bangalore (IN)

(73) Assignee: ABB Technology Ltd, Zurich (CH)

( * ) Notice: Subject to any disclaimer, the term of this patent is extended or adjusted under 35 U.S.C. 154(b) by 349 days.

(21) Appl. No.: 13/310,388

(22) Filed: Dec. 2, 2011

(65) Prior Publication Data

US 2012/0173958 A1 Jul. 5, 2012

Related U.S. Application Data

(63) Continuation of application No. PCT/IB2009/007704, filed on Dec. 10, 2009.

(30) Foreign Application Priority Data

Jun. 3, 2009 (IN) .......................... 1316/CHE/2009

(51) Int. Cl.
 *G06F 15/16* (2006.01)
 *H04L 29/08* (2006.01)
(52) U.S. Cl.
 CPC .............. *H04L 67/125* (2013.01); *H04L 67/02* (2013.01); *Y04S 40/16* (2013.01)
 USPC .......................................... 709/220; 709/232
(58) Field of Classification Search
 CPC ....................................................... H04L 67/00
 USPC ................................... 709/206, 220–221, 232
 See application file for complete search history.

(56) References Cited

U.S. PATENT DOCUMENTS 6,178,362 B1 * 1/2001 Woolard et al. ............... 700/295
6,757,753 B1 * 6/2004 DeKoning et al. .............. 710/38

(Continued)

FOREIGN PATENT DOCUMENTS

DE 103 07 332 A1 9/2004
EP 1 976 218 A1 10/2008

OTHER PUBLICATIONS

International Search Report dated Aug. 5, 2010, issued in corresponding International Application No. PCT/IB2009/007704. (4 pages).

(Continued)

*Primary Examiner* — Ebrahim Golabbakhsh
(74) *Attorney, Agent, or Firm* — Buchanan Ingersoll & Rooney PC

(57) ABSTRACT

A method, a substation automation apparatus and an intelligent electronic device (IED) are disclosed which are, for example, not limited only to publishing data (data emanating) from the IED. An exemplary method includes assigning a unique identifier to one or more data fields, where the one or more data fields is associated with a short address attribute in the data emanating from the intelligent electronic device; and dynamically updating the identifier based on user specific configuration data by an IED application configuration tool. The IED can include a list of functions; (e.g., each function being represented as a logical node; and each logical node containing data objects); and a flexible addressing scheme for configuring the data objects and publishing data from the IED, but not only data emanating from IED.

9 Claims, 9 Drawing Sheets

(56) References Cited

U.S. PATENT DOCUMENTS

| | | |
|---|---|---|
| 2002/0052138 A1* | 5/2002 | Janik .......................... 439/535 |
| 2003/0098782 A1* | 5/2003 | Eastman et al. ............. 340/7.46 |
| 2006/0259158 A1* | 11/2006 | Cooney et al. ................. 700/19 |
| 2006/0262784 A1* | 11/2006 | Cheethirala et al. .......... 370/389 |
| 2007/0043684 A1* | 2/2007 | Nehowig et al. ............... 705/76 |
| 2008/0044006 A1* | 2/2008 | Kitagawa ................. 379/433.01 |
| 2008/0127210 A1* | 5/2008 | Bosold et al. ................. 719/313 |
| 2010/0020724 A1 | 1/2010 | Wimmer et al. |

OTHER PUBLICATIONS

Brunner, "IEC 61850 Object Model and Configuration Language" Internet Citation, Mar. 10, 2003, Retrieved from the internet: URL:http://www.pes-psrc.org/h/H5/H5-Brunner_61850-intro.pdf, XP-002578383. (12 pages).

Brand, "IEC 61850 Short Tutorial" Internet Citation, Mar. 2005, Retrieved from the internet: URL:http://www.ceb5.cepel.br/arquivos/eventos_setor/iec61850_tutoria.pdf, XP-002558218, (17 pages).

Brand, "The Standard IEC 61850 as Prerequisite for Intelligent Applications in Substations" Power Engineering Society General Meeting, Jun. 6, 2004, IEEE, IEEE, Piscataway, NJ, USA, XP-010756486. (5 pages).

Flores et al., "Case Study Design and Implementation of IEC 61850 From Multiple Vendors at CFE La Venta II" Protective Relay Engineers, Mar. 1, 2007, 60th Annual Conference for, IEEE, PI, XP-031088006. (pp. 307-320).

* cited by examiner 88
82

<LN prefix="CB" lnClass="CSWI" inst="9" lnType="ABBREF542plus_CSWI" desc="Switching object 2-2 Circuit Breaker CB1">
..........
    <DOI name="Pos">
        <DAI name="stVal" desc="Circuit Breaker Switching Object 2-2SynchByPass" sAddr="DPC,SPA_4P_BYPASS,9,I,1,True,4,1,2,0,9,V,1,21,22,9,V,13,14,11,10,12,9,V,15,1,0,9,V,16,1,0" valKind = "Set"/>
.........

</DOI>
.........
</LN>

```
                    92                              82
                     ⏜                              ⏜
<LN prefix="CB" lnClass="CSWI" inst="9" lnType="ABBREF542plus_CSWI" desc="Switching object 2-2 Circuit
    <DOI name="Mod">
        ..........
    </DOI>
    ..........                      94
    <DOI name="OpCnt">               ⏜
        <DAI name="stVal" sAddr="IN,9,V,100" valKind="Set"/>
        <DAI name="d" valKind="Set"/>
    </DOI>                                    96
    <DOI name="Pos">                           ⏜
        <DAI name="stVal" sAddr="DPC,IND_ONLY,9,1,True,4,1,2,0" valKind="Set"/>
        <DAI name="ctModel" valKind="RO">
        <DAI name="d" valKind="Set"/>
    </DOI>                                98
    <DOI name="BlkOpn">                    ⏜
        <DAI name="stVal" sAddr="SPC,SPA_IF,9,14,15,16,0,I,0,0,0" valKind="Set"/>
        <DAI name="ctModel" valKind="RO">
        <DAI name="d" valKind="Set"/>
    </DOI>                           100
    <DOI name="BlkCls">               ⏜
        <DAI name="stVal" sAddr="SPC,SPA_IF,9,14,15,16,0,I,0,0,0" valKind="Set"/>
        <DAI name="ctModel" valKind="RO">
        <DAI name="d" valKind="Set"/>
    </DOI>
    ..........
</LN>
```

FIG.7

METHOD AND SYSTEM FOR PUBLISHING DATA FROM INTELLIGENT ELECTRONIC DEVICES

RELATED APPLICATION

This application claims priority as a continuation application under 35 U.S.C. §120 to PCT/IB2009/007704, which was filed as an International Application on Dec. 10, 2009 designating the U.S., and which claims priority to Indian Application 1316/CHE/2009 filed in India on Jun. 3, 2009. The entire contents of these applications are hereby incorporated by reference in their entireties.

The present disclosure relates generally to the field of substation automation, and to the intelligent electronic devices deployed in the substations.

BACKGROUND

An electrical or power substation involves electricity transmission and distribution systems where voltage is transformed from high to low or the reverse using transformers. Electric power may flow through several substations between generating plant and consumer, and may be changed in voltage in several steps.

The substations can include one or more transformers, and switching, protection, control, metering and grounding equipment. Appropriate equipments are selected for these functions depending on whether the substation is a transmission, sub-transmission, or distribution substation. Currently different types of Intelligent Electronic Devices (IEDs) are used in the substation to cater to different substation functions. The IEDs are microprocessor-based controllers of power system equipment, such as circuit breakers, generators, transformers, power lines, power cables, reactors, motors, capacitor banks etc. For example, the IEDs receive data from sensors and power equipment, and can issue control commands, such as tripping circuit breakers if they sense voltage, current, or frequency anomalies, or raise/lower voltage levels in order to maintain the desired level. Known types of IEDs include protective relaying devices, load tap changer controllers, circuit breaker controllers, recloser controllers, voltage regulators, etc. With the available microprocessor technology, a single unit can perform several protection, metering, monitoring and control functions concurrently.

Substation automation can be an important and complex aspect for maintenance and control of different equipments involved in different processes within the substation. Multiple protocols exist for substation automation, which include many proprietary protocols with custom communication links. However, interoperation of devices from different vendors can be highly desired for simplicity in implementation and use of substation automation devices.

The IEC61850 standard from International Electrotechnical Commission (IEC) advocates interoperability amongst Intelligent Electronic Devices (IEDs) from various manufacturers using common engineering models, data formats and communication protocol. Recent IEDs are therefore designed to support the IEC61850 standard for substation automation, which provides interoperability and advanced communications capabilities.

IEC 61850 features include data modeling where complete functionality of the substation is modeled into various IEC61850 compliant logical nodes that are grouped and arranged under different logical devices. Logical nodes are the smallest part of a function that exchanges data and these logical nodes are objects defined by its data and methods. Logical devices are virtual devices that exist to enable aggregation of logical nodes and data sets for communication purposes.

There are logical nodes for data/functions related to the logical device (LD) and physical device (LPHD). The data can emanate from an IED through various schemes like GOOSE (Generic Object Oriented Substation Events) events, reports, Sampled and Measured Values (SMVs). An IED can receive the commands from a client or peer IEC 61850 system. Regarding data storage, a SCL (Substation Configuration Language) is defined for complete storage of configured data of the substation in a specific format.

The abstract data models defined in IEC61850 can be mapped to a number of protocols. Current mappings in the standard are to MMS (Manufacturing Message Specification), GOOSE (Generic Object Oriented Substation Event), SMV (Sample Measured Values), and soon to Web Services. These protocols can run over TCP/IP networks and/or substation LANs (local area networks) using high speed switched ethernet to obtain desired response times of less than four minutes for protective relaying.

The IEC61850 standard also makes provision for addressing of data within an IED that is generally, addressed by respective IED engineering/configuration tools. The addressing concepts are adapted to suit the philosophies that are applicable for any internal variables' data being communicated between the IED's hardware components.

The IEC61850 standard supports two different attributes for addressing, depending on whether data emanates from the IED or in other words is published from the IED, using GOOSE/SMV/MMS profile or whether the IED receives data from other peer IEDs, using the GOOSE/MMS communication profiles. The information terminating into the IED via GOOSE should be flexible as one may not know the number of signals being subscribed by the IED from other peer IEDs a priori, when the IED engineering is started.

For IEDs that support a predefined or fixed super set of configurations, the internal addressing can be generally constant. The IED tool, based on the selected configuration, generates the desired ICD/CID file (IED configuration description file/Configured IED Description file) for publishing information. However, for IEDs like Process Controllers or 'Intelligent' Remote I/O systems or 'I/O configurable' Protection and Control relays, that allow partial or completely flexible arbitrary configurations, a constant addressing scheme can limit the functionality. Unless the address scheme is a flexible one, the information that is to be published from the mentioned IED types (Process Controllers or 'Intelligent' Remote I/O systems or 'I/O configurable' Protection and Control relays) to other recipient IEDs may not be unique.

Hence, the present disclosure presents a flexible addressing technique that utilizes the ability of IEDs to be configured as per a user or substation specification.

SUMMARY

According to an exemplary aspect of the present disclosure, a method is disclosed for publishing data emanating from an intelligent electronic device (IED). The method can include assigning an identifier to at least one data field, where the at least one data field is associated with a short address attribute in the data emanating from the intelligent electronic device; and dynamically updating the identifier based on user specific configuration data by an IED configuration tool.

According to another exemplary aspect, a substation automation apparatus is disclosed for controlling and monitoring operations at a substation. The substation automation system includes plural intelligent electronic devices (IEDs), each of the IEDs having a distinct capability, the distinct capability being represented as a list of functions. each function from the list of functions being represented as a logical node, each logical node containing at least one data object, wherein at least one data object employs a flexible addressing scheme for publishing data emanating from the IED; and an IED configuration tool for configuring a subset of functions from the list of functions provided by the IED based on specifications of the substation, where the IED configuration tool is configured to dynamically update the at least one data object using the flexible addressing scheme.

In yet another exemplary aspect, an intelligent electronic device (IED) for monitoring and control of operations in a substation is disclosed. The IED includes a list of functions, each function being represented as a logical node, and each logical node representing at least one data object, and a flexible addressing scheme for configuring the at least one data object from plural data objects and publishing data from the IED.

DRAWINGS

These and other features, aspects, and advantages of the present disclosure will become better understood when the following detailed description is read with reference to the accompanying drawings in which like characters represent like parts throughout the drawings, wherein:

FIG. 6 is a snapshot representation depicting use of an exemplary flexible addressing scheme for publishing data from the IED in another exemplary embodiment of a Protection and Control Relay as a switching object;

FIG. 7 is a snapshot representation depicting use of an exemplary flexible addressing scheme for publishing data from the IED in another exemplary embodiment of a Protection and Control Relay as a switching object;

Figure 8:
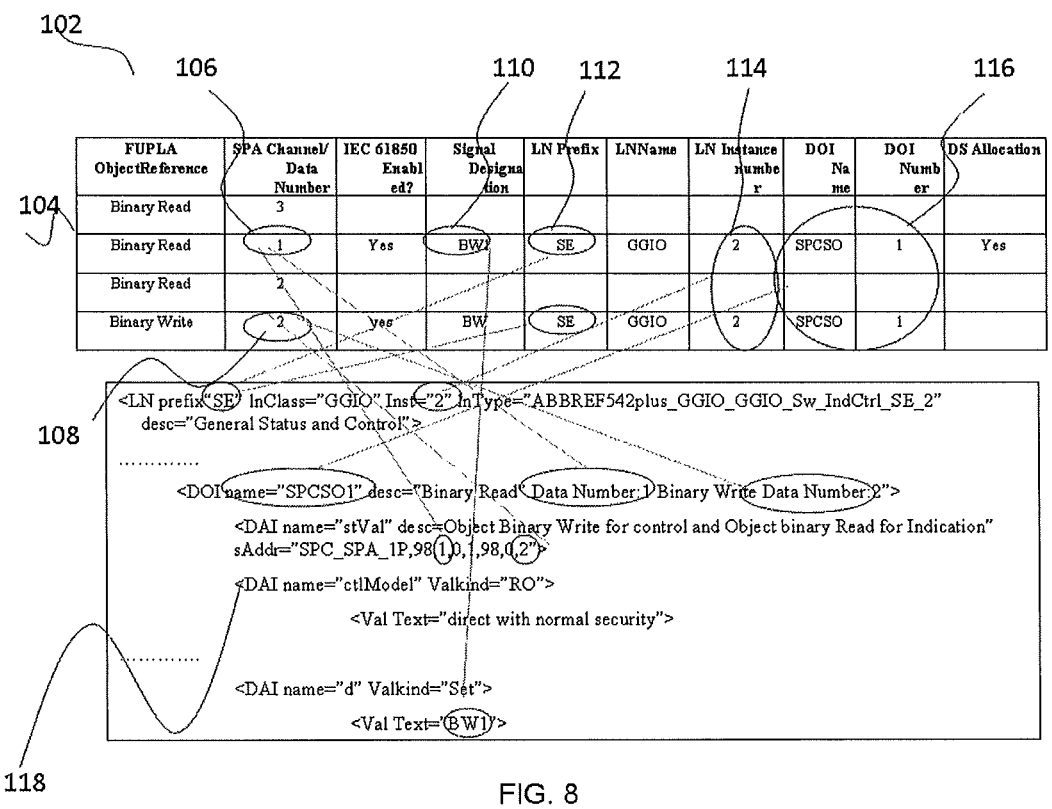
Figure 9:
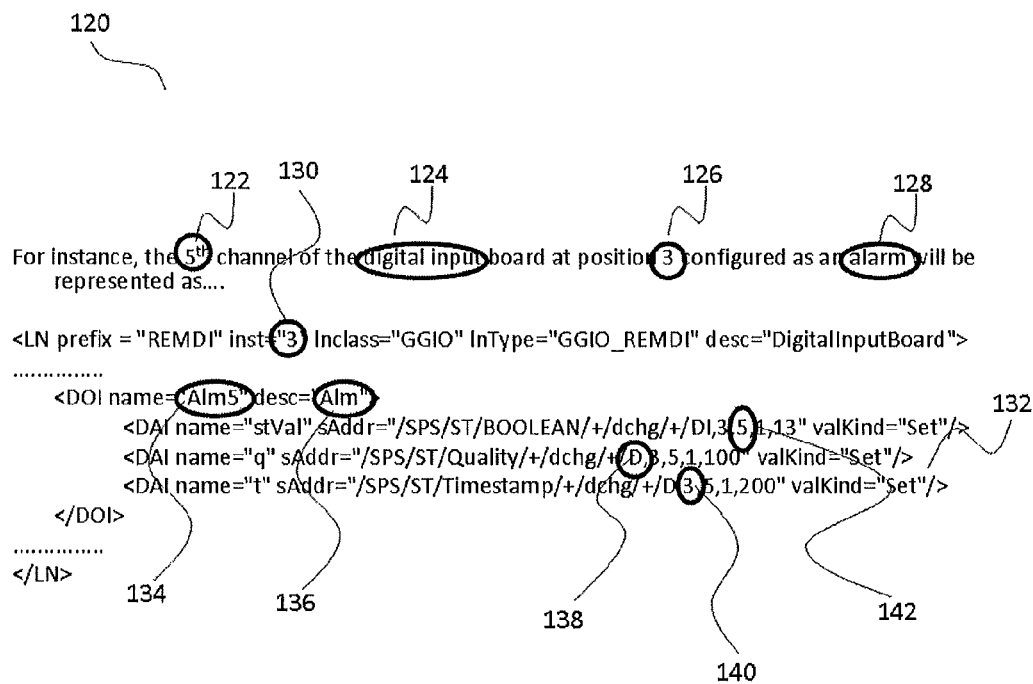

FIG. 8 is a snapshot representation depicting use of an exemplary flexible addressing scheme for publishing data from the IED in another exemplary embodiment of a Protection and Control Relay as a generic Input Output; and FIG. 9 is a snapshot representation depicting use of an exemplary flexible addressing scheme for publishing data from the IED in another exemplary embodiment of an Intelligent Distributed Input/Output system.

DETAILED DESCRIPTION

A method and system for publishing data from intelligent electronic devices (IEDs) using a flexible addressing concept are disclosed that, for example, function to dynamically populate the addressing fields in the data or information published by the IED operating in an IEC 61850 environment. This functionality is implemented in respective IED configuration tools. Flexibility as referred in this context amounts, for example, to having a unique identifier, for the emanating data out of an IED (published from the IED) and data subscribed into the IED.

Figure 1:
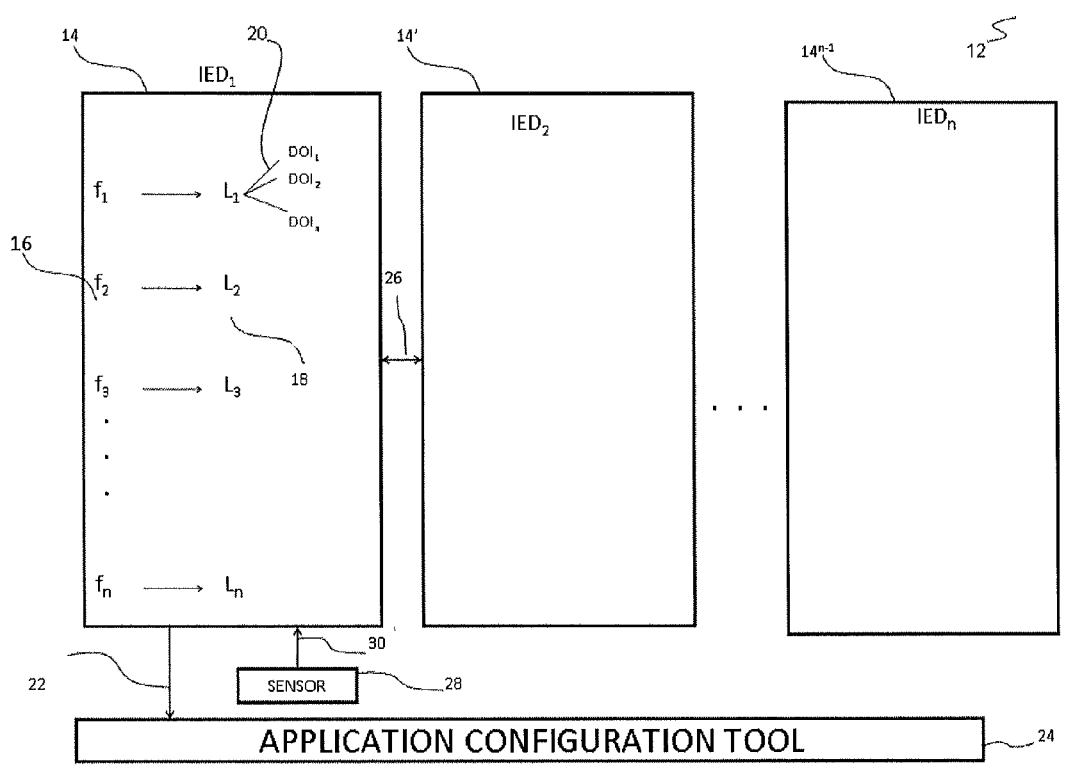
FIG. 1 is a block diagram representation of exemplary Intelligent Electronic Devices (IEDs) along with their functions, data and a configuration tool.

Referring now to FIG. 1, an exemplary substation automation system is shown generally by reference numeral 12. The system 12 includes several intelligent electronic devices (IEDs) shown by reference numerals 14, 14', 14" ... $14^{n-1}$. An IED is represented as a physical device which includes several logical devices. Each of the IEDs have a distinct capability, the distinct capability is for example, represented as a list of functions, shown as $f_1 \ldots f_n$ indicated by reference numeral 16. Some examples of these functions include power system equipment protection (based on over or under current, over or under voltage, over or under frequency, power, impedance etc.), control, metering and monitoring. Each function from this list of functions is represented as a Logical Node (LN), shown as $L_1 \ldots L_n$ indicated by reference numeral 18. Each Logical Node further contains several 'Data Objects Instantiated' (DOI) 20, shown as $DOI_1 \ldots DOI_n$.

According to exemplary aspects of the presently disclosed technique one or more Data Objects employ a flexible addressing scheme for publishing data (data emanating) from the IED shown generally by reference numeral 22. As those skilled in the art will appreciate, a short address attribute (sAddr) can be defined with every DOI associated with a Logical Node that represents the functionality implemented in the IED. The representation of this short address attribute varies from IED to IED depending on the internal addressing schemes, prevalent in the IED. An exemplary flexible addressing scheme as described herein includes assigning an identifier to the one or more DOIs providing flexibility in addressing the DOIs and for proper mapping of published information from the IED over MMS/GOOSE/SMV.

The system 12 also includes sensors 28 to collect field data that is communicated as SMVs (Sampled Measure Values), depicted by reference numeral 30 to one or more IEDs. It will be appreciated by those skilled in the art that the sensors could, for example, also be IEDs. The different IEDs communicate with each other as shown by reference numeral 26 using GOOSE/MMS and the IEDs also publish data to be sent to a user display monitor or IED (application) configuration tool 24 as described herein using MMS as depicted by reference numeral 22.

The system 12 includes an IED configuration tool 24 as shown in FIG. 1, for configuring a subset of functions from the list of functions provided by the IED as described hereinabove, based on specifications (e.g., requirements) of the substation. As will be apparent to those skilled in the art, a user can configure the IED by mixing and matching different functions according to the final application desired at the substation using the IED configuration tool 24. Further, according to aspects of exemplary presently disclosed techniques, the IED configuration tool 24 can be used to dynamically ('on the fly', without any prior type definitions in the configuration tool or user intervention) update the one or more DOIs by updating the identifier using the flexible addressing scheme. The short address attribute as described hereinabove can be dynamically updated by the IED configuration tool based on the configured information. The updating of configured information may be based on user specific configuration data or automatic configuration data from the IED application configuration tool or in response to virtual (calculated) signals received from application logic of the IED.

Besides this, additional attributes like LN prefixes (LN prefix gives more information on the application for which the LN is modeled) and instance numbers (the instances of such a LN Type) can also be dynamically updated based on user/automatic configuration according to exemplary aspects of the presently disclosed technique. An example illustrating the above is given below using IEC61850—Substation Configuration Language (SCL):

```
<LN prefix="xyz" inst="abc" InClass="GGIO" InType="GGIO_xyz"
    desc="Generic I/O function">
<DOI name="Alm" desc="Start">
<DAI sAddr="xxxxxxxxxxxxxx" name="general" valKind="Set" />
<DAI name="d" valKind="Set">
<Val>GGIO_ALM</Val>
</DAI>
</DOI>
</LN>
```

The above is an example of a Generic I/O function based Logical Node. The Application function in the IED generates an Alarm condition (based on some process condition) that is to be published on the IEC61850. This function is mapped to a GGIO LN. The Alarm condition output information is mapped to a DOI 'Alm' under the GGIO LN node. As will be appreciated by those skilled in the art, the 'Alm' DOI includes at least two Data Attributes. One of the 'Data Attributes Instantiated' (DAI) is the short address that is to be updated with a dynamic value according to the internal addressing rules in the host IED. The update of the short address is based on select conditions that include the data type which is the IED's internal reference with respect to a register communication address register or a reference to its internal application logic etc. Other information that could be included in the short address definitions could be the data handling criteria like minimum and, maximum values, deadbands etcetera.

Figure 2:
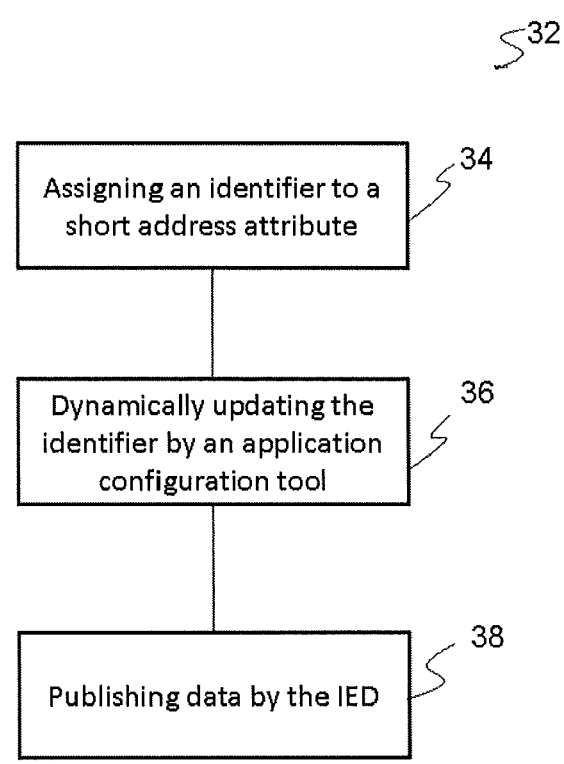
FIG. 2 is flow chart representation of exemplary steps for a method of publishing data from the IED.

FIG. 2 is an exemplary flowchart 32 describing exemplary steps for a method for publishing data emanating from an IED. The method includes at step 34 assigning an identifier to one or more data fields, where the one or more data fields are associated with a short address attribute in the data emanating from the intelligent electronic device. At step 36 the identifier is dynamically updated using the configured data information from a user specific configuration data or automatic configuration data. And at step 38 the data is published by the IED.

As will be appreciated by those skilled in the art, the method described herein provides a flexible way to configure an IEC 61850 configuration file when the number of Inputs/Outputs (I/Os), or functions are unknown for an application. This technique can be especially advantageous for generic I/Os, power control applications that work on varied number of I/Os. The number of such I/Os may not be predetermined during the supply of IEDs to a user or customer. Thus, using the identifier based flexible addressing scheme, the user can implicitly and easily configure a 61850 configuration file using the application configuration tool.

Figure 3:
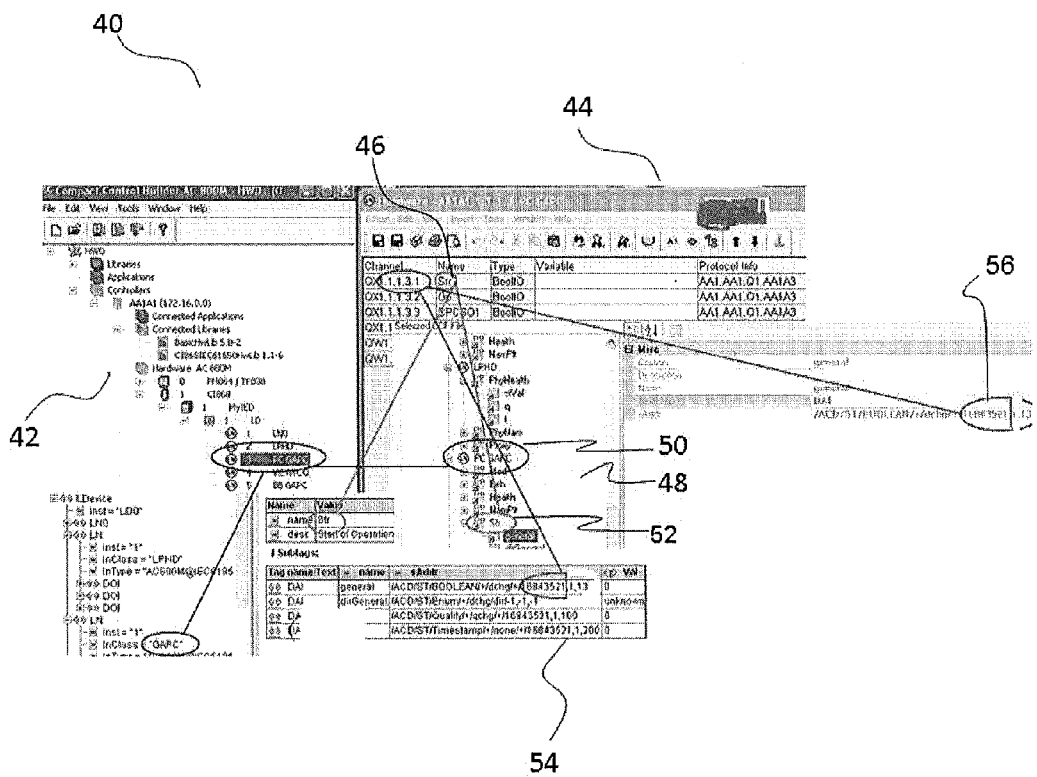
FIG. 3 is a snapshot depicting use of an exemplary flexible addressing scheme for publishing data from the IED according to one exemplary embodiment of a Distributed Control System (DCS) Process Controller.

FIG. 3 is an exemplary computer screen snapshot 40 where the identifier is associated with a channel of a virtual output card in the intelligent electronic device to implement a Process Controller, for example a Distributed Control System (DCS) Processor Controller. The DCS Process Controller, referenced herein can be a real time embedded device that is used in implementation of power automation functions and is IEC61850 compliant.

The snapshot 40 was created by using a process controller configuration tool. Reference numeral 42 indicates a Process Controller configuration tool tree view, created after importing an SCD file, with focus on a 'Virtual Output' module PC GAPC. Reference numeral 44 is an editor view of the Process Controller configuration tool corresponding to PC GAPC with a channel 'Str' (start) indicated by reference numeral 46. Reference numeral 48 is an SCL file view integrated with Process Controller configuration tool, showing the corresponding Logical Node LN PCGAPC at reference numeral 50 and DOI 'Str' at reference numeral 52 A view of a SCL file in a standard XML editor is depicted by reference numeral 54.

It will be appreciated by those skilled in the art that the creation of the Process Controller configuration tool tree view as shown herein can be completely dependent on the content of the SCD file that in turn is dependent on process logic running in the Controller. Hence, the content in the tree is completely flexible. In such a scenario, it can be advantageous if the short addressing is adaptive as well, as described herein below.

It can be seen from FIG. 3 at reference numeral 44, the 'Str' channel id is 1.1.3.1. The IED tool converts this into a hex equivalent of 01010301, whose decimal equivalent is 16843521 as shown at reference numeral 56. This address or identifier 56 is assigned to all attributes under the 'Str' DOI. As will be appreciated by those skilled in the art, the identifier may be employed to indicate a general attribute or a quality and timestamp.

In the DCS process controller described herein, the dynamically created 'Virtual Output' units are related to Logical Nodes. The Virtual Output units or cards are created using the identifier that is updated based on the configured functionality in the Controller like voltage control, synchronisation, load shedding etc (as is done in the Analog or Digital Output cards). These Virtual Output units have channels that are co-related to DOIs. The channel identifier or address is updated as a part of short address attribute based on the data type of the variable.

Figure 4:
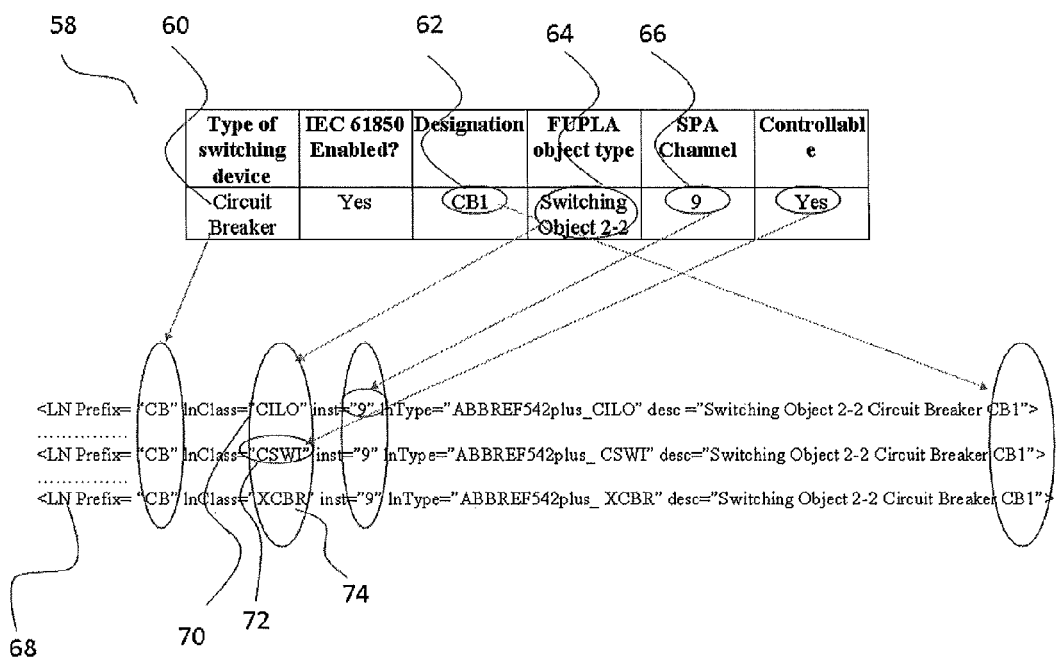
FIG. 4 is a snapshot representation depicting use of an exemplary flexible addressing scheme for publishing data from the IED in another exemplary embodiment of a Protection and Control Relay as a switching object.

FIG. 4 is a computer screen snapshot 58 where the identifier is associated with an Input/Output (I/O) node of the intelligent electronic device to implement a Protection and Control Relay. A switching object refers to a primary equipment like a circuit breaker CB, shown by reference numeral 60, which is controlled from the IED. Here, the I/O configurable protection is based on user configuration data, besides the information based on actual signal assignments for that data point. The short address is updated with both the above aspects. As shown in FIG. 4, a circuit breaker CB1 indicated by reference numeral 62 indicated as switching object at 64 is configured with a signal assignment '9' indicated by reference numeral 66 with additional information from a user interface indicated by 68 and results in the output as described below.

Referring again to FIG. 4, a Logical Node CILO, associated with a Switching Object 2-2, is indicated by reference numeral 70, with LN instance '9', and is updated with the prefix as per object type and CB designation in the description, as described herein. Similarly Logical Nodes CSWI and XCBR indicated by reference numerals 72 and 74 respectively, are also updated. Further updated aspects with respect to 70, 72, and 74 are described in more detail in reference to FIG. 5-7.

Figure 5:
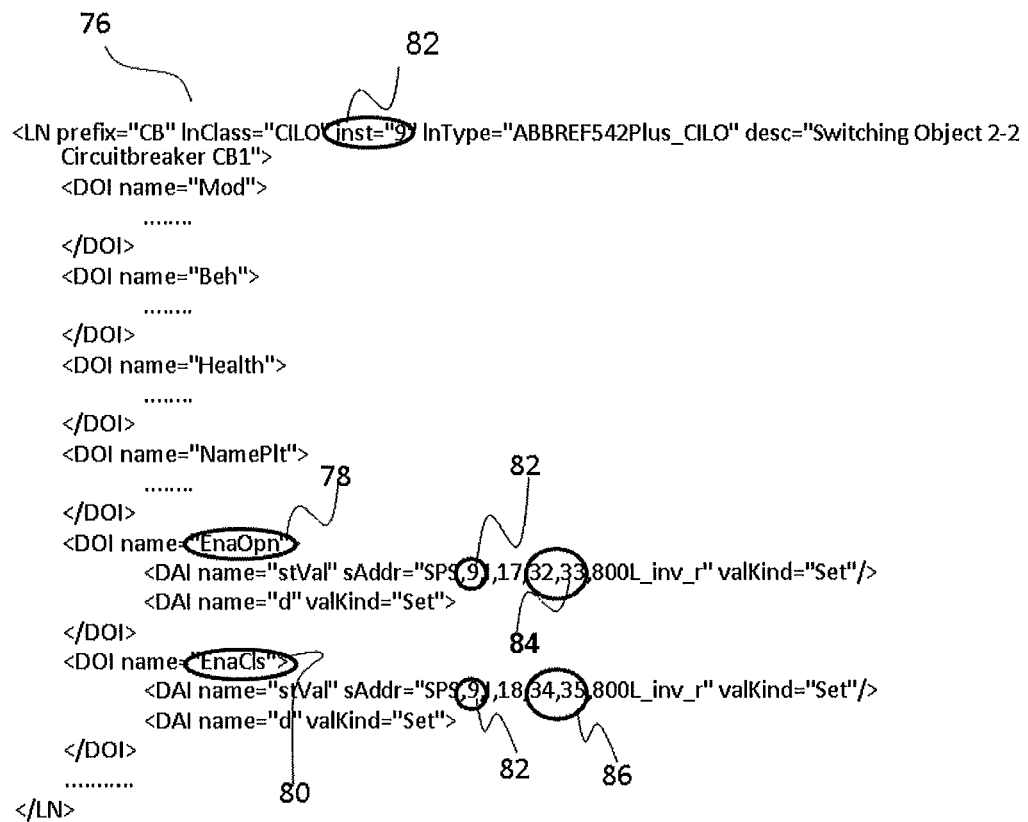
FIG. 5 is a snapshot representation depicting use of an exemplary flexible addressing scheme for publishing data from the IED in another exemplary embodiment of a Protection and Control Relay as a switching object.

Referring now to FIG. 5, the snapshot 76, LN CILO as described in reference to FIG. 3 has two DOIs; EnaOpn indicated by reference numeral 78 and EnaCls as indicated by reference numeral 80 whose short addresses are updated with the same data as the signal assignment indicated by reference numeral 82 and event numbers 84, 86 respectively for spontaneous transmission.

In another example, as shown in FIG. 6, a snapshot 88 for the Logical Node CSWI (shown also in FIG. 4), with LN instance 9 indicated by reference numeral 82, is updated as shown at reference numeral 90 with the prefix as per object type and CB designation in the description.

In another example, as shown in FIG. 7, a snapshot 92 for a Logical Node XCBR (shown also in FIG. 4), with LN instance 9 indicated by reference numeral 82, is updated with the prefix as per object type and CB designation in the description as shown by reference numerals 94, 96, and 100.

In another example, a snapshot 102 for a generic input and output is shown in FIG. 8. A combined binary output and input functionality indicated by reference numeral 104 is updated, each being configured from a user interface with additional IEC61850 definitions, and results in a GGIO LN with co-relations. The signal assignments '1' and '2', indicated by reference numerals 106 and 108 respectively, are updated as LN/DOI short address attributes and as DO description attributes as indicated by reference numerals 110, 112, 114 and 116. The signal descriptions are updated as a DO (SPCSO) 'd' attribute value as shown in the snapshot 118. It can be seen that the OpCnt, Pos, BlkOpn and BlkCls DOI's short address fields are updated with the same data as the signal assignment. Also, the Pos DOI's short address fields are updated with the same data as the signal assignment.

FIG. 9 is a computer screen snapshot 120 of another example, where the identifier is associated with a position and a channel number of an Analog/Digital Input board, where the Analog/Digital Input board is configured using an application configuration tool to implement an Intelligent Distributed I/O IED. Depending on the position of the module and the channel number, the short address attribute is updated. For example, a 5$^{th}$ channel indicated by reference numeral 122 of the digital input board 124 at position '3' indicated by reference numeral 126 is configured as an alarm as indicated by reference numeral 128. The LN instance associated therewith is 3 as indicated by reference numeral 130. The updated profile is shown generally by reference numeral 132 and the updated attributes are shown by reference numerals 134-142.

The field data collected by the Analog/Digital Input boards could be sent to other IEDs using the GOOSE/SMV/MMS communication profiles. Similarly, another channel in the same board can be configured as an event by mapping it as an 'Ind' DOI. Data collected by an Analog Input board could be mapped as MV or SAV DOIs.

Thus according to exemplary aspects of the presently disclosed technique, the configurable/modular devices can be addressed in a flexible manner using signals from field or virtual signals from application logic emanating out of the IED. The short address using the identifier can be used to fetch the data from the IED and can also be used to verify the actual hardware configuration, before the configuration file is accepted by the IED. Thus, the method described herein also provides a way to verify (through the IED Configuration Tool in the case of but not limited to an online configuration mechanism or through the IED in the case of offline configuration mechanism) the IEC61850 configuration file (ICD/CID) with respect to actual device configuration/device capability. The verification step is an added feature that can ensure correctness of configuration. Also, based on the application, the allocation of functions and logical nodes can be grouped and the data model can be arranged to map the actual product.

It may also be noted that though the description refers to IEC 61850 standard, the above described methods and systems may also be translated to other standards, and the IEC 61850 standard is an exemplary non-limiting implementation of the technique and systems disclosed herein.

While only certain features of the invention have been illustrated and described herein, many modifications and changes will be apparent to those skilled in the art. It is, therefore, to be understood that the appended claims are intended to cover all such modifications and changes as fall within the true spirit of the invention.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

We claim:

1. A method for publishing data emanating from an intelligent electronic device (IED), the method comprising:
    assigning an identifier to at least one data field, wherein the at least one data field is associated with a short address attribute in the data emanating from the intelligent electronic device; and
    dynamically updating the identifier based on user specific configuration data by an IED configuration tool, based on at least one of automatic configuration data from the IED configuration tool, and user specific configuration data, wherein the updated identifier is indicative of one or more properties of the at least one data object;
    receiving IED configuration data from the IED configuration tool, wherein the IED configuration data includes configuration data associated with the at least one data object;
    verifying the IED configuration data based on the updated identifier; and
    publishing data of the intelligent electronic device, wherein the published data includes short address attribute having the updated identifier,
    wherein the updated identifier is associated with at least one of a channel of a virtual output card in the IED, an Input/Output node of the IED, and a channel of an input board configured using the IED configuration tool.

2. The method of claim 1, wherein the dynamically updating is in response to virtual signals received from application logic of the intelligent electronic device.

3. The method of claim 1, wherein the identifier is associated with a position and a channel number of an Analog/Digital Input board, wherein the Analog/Digital Input board is configured using an IED configuration tool.

4. The method of claim 1, wherein the identifier is associated with a position and a channel number of an Analog/Digital Input board, wherein the Analog/Digital Input board is configured using an IED configuration tool.

5. The method of claim 2, wherein the identifier is associated with a position and a channel number of an Analog/Digital Input board, wherein the Analog/Digital Input board is configured using an IED configuration tool.

6. A substation automation apparatus for controlling and monitoring operations at a substation, comprising:
    plural intelligent electronic devices (IEDs), each of the IEDs having a distinct capability, the distinct capability being represented as a list of functions, each function from the list of functions being represented as a logical node, each logical node containing at least one data object, wherein at least one data object employs a flexible addressing scheme for publishing data emanating from the IED, the flexible addressing scheme having an identifier assigned to the at least one data object for dynamic updating, wherein the at least one data object is associated with a short address attribute in data emanating from the IED; and an IED configuration tool for configuring a subset of functions from the list of functions provided by each IED based on specifications of the substation, wherein the IED configuration tool is configured to dynamically update the at least one data object using the flexible addressing scheme based on at least one of automatic configuration data of the IED configuration tool and user specific configuration data, wherein dynamically updating the at least one data object includes updating the identifier which is indicative of one or more properties of the at least one data object, and wherein the identifier is associated with at least one of a channel of a virtual output card in a respective IED, an Input/Output (I/O) node of the respective IED, and a channel of an input board configured using the IED configuration tool, wherein each IED is configured to receive IED configuration data from the IED configuration tool, verify the IED configuration data based on the updated identifier; and publish data of the intelligent electronic device, wherein the IED configuration data includes configuration data associated with the at least one data object, AND wherein the published data includes the short address attribute having the updated identifier.

7. An intelligent electronic device (IED) for monitoring and control of operations in a substation, the IED comprising:
a processor configured to include:
a list of functions, each function being represented as a logical node, each logical node representing at least one data object; and
a flexible addressing scheme for configuring the at least one data object from plural data objects and publishing data from the IED, based on an identifier assigned to the at least one data object, wherein the identifier is dynamically updated, each logical node is verified based on the updated identifier, and the at least one data object is associated with a short address attribute in data published from the IED,
wherein the identifier is associated with at least one of a channel of a virtual output card in the IED, an Input/Output (I/O) node of the IED, and a channel of an input board configured using an IED configuration tool, and
wherein the updated identifier is indicative of one or more properties of the at least one data object.

8. The substation automation apparatus of claim 6, wherein the dynamically updating is in response to virtual signals received from application logic of the intelligent electronic device.

9. The IED of claim 7, wherein the dynamically updating is in response to virtual signals received from application logic of an intelligent electronic device.

* * * * *